(12) United States Patent
Watanabe et al.

(10) Patent No.: US 6,396,321 B1
(45) Date of Patent: May 28, 2002

(54) SEMICONDUCTOR INTEGRATED CIRCUIT EQUIPPED WITH FUNCTION FOR CONTROLLING THE QUANTITY OF PROCESSING PER UNIT TIME LENGTH BY DETECTING INTERNALLY ARISING DELAY

(75) Inventors: Masataka Watanabe; Shuichi Moriyama, both of Niigata (JP)

(73) Assignee: NEC Corporation, Tokyo (JP)

(*) Notice: Subject to any disclaimer, the term of this patent is extended or adjusted under 35 U.S.C. 154(b) by 0 days.

(21) Appl. No.: 09/511,327

(22) Filed: Feb. 23, 2000

(30) Foreign Application Priority Data

Feb. 24, 1999 (JP) .......................................... 11-046016

(51) Int. Cl.[7] ................................................. H03L 7/06
(52) U.S. Cl. ..................... 327/158; 327/261; 327/512; 327/149
(58) Field of Search ............................... 327/262, 149, 327/158, 295, 261

(56) References Cited

U.S. PATENT DOCUMENTS 4,789,996 A * 12/1988 Butcher ........................ 375/120
4,922,141 A * 5/1990 Lofgren et al. ............. 327/158
5,428,309 A * 6/1995 Yamauchi et al. .......... 327/158
5,565,816 A * 10/1996 Coteus ........................... 331/2

FOREIGN PATENT DOCUMENTS

| JP | 63-133534 | 6/1988 |
| JP | 64-481119 | 2/1989 |
| JP | 2-199851 | 8/1990 |
| JP | 10-189884 | 7/1998 |
| JP | 10-312316 | 11/1998 |

* cited by examiner

Primary Examiner—Toan Tran
Assistant Examiner—Quan Tra
(74) Attorney, Agent, or Firm—McGinn & Gibb, PLLC (57) ABSTRACT

A semiconductor integrated circuit 10 comprises an internal logic circuit 16, a delay detecting circuit 11 which monitors changes in delay length within the semiconductor integrated circuit 10, and a central control circuit 14 which controls the quantity of processing per unit time length by the internal logic circuit 16 on the basis of changes in delay length monitored by the delay detecting circuit 11.

12 Claims, 8 Drawing Sheets

PRIOR ART

Fig. 8

SEMICONDUCTOR INTEGRATED CIRCUIT EQUIPPED WITH FUNCTION FOR CONTROLLING THE QUANTITY OF PROCESSING PER UNIT TIME LENGTH BY DETECTING INTERNALLY ARISING DELAY

BACKGROUND OF THE INVENTION

The present invention relates to a semiconductor integrated circuit equipped with a mechanism for detecting any delay arising within the semiconductor integrated circuit and controlling the quantity of processing by an internal logic circuit per unit time length on the basis of the result of this detection.

Generally, the main reasons for an increase in delay arising within an LSI are a drop in voltage at the source of power supplied to the LSI and an increase in internal resistance of the LSI accompanying a temperature rise therein. The causes of a temperature rise in an LSI in turn include an increase in the LSI's power consumption ensuing from increased processing within the LSI.

In recent years, attempts to achieve an even higher scale of integration and a still higher speed of processing have been made on LSIs, and in some cases the temperature of the operating LSI exceeds the normative higher limit beyond which the stability of the LSI's operation may be lost unless the temperature rise is suppressed somehow from outside.

Figure 8:
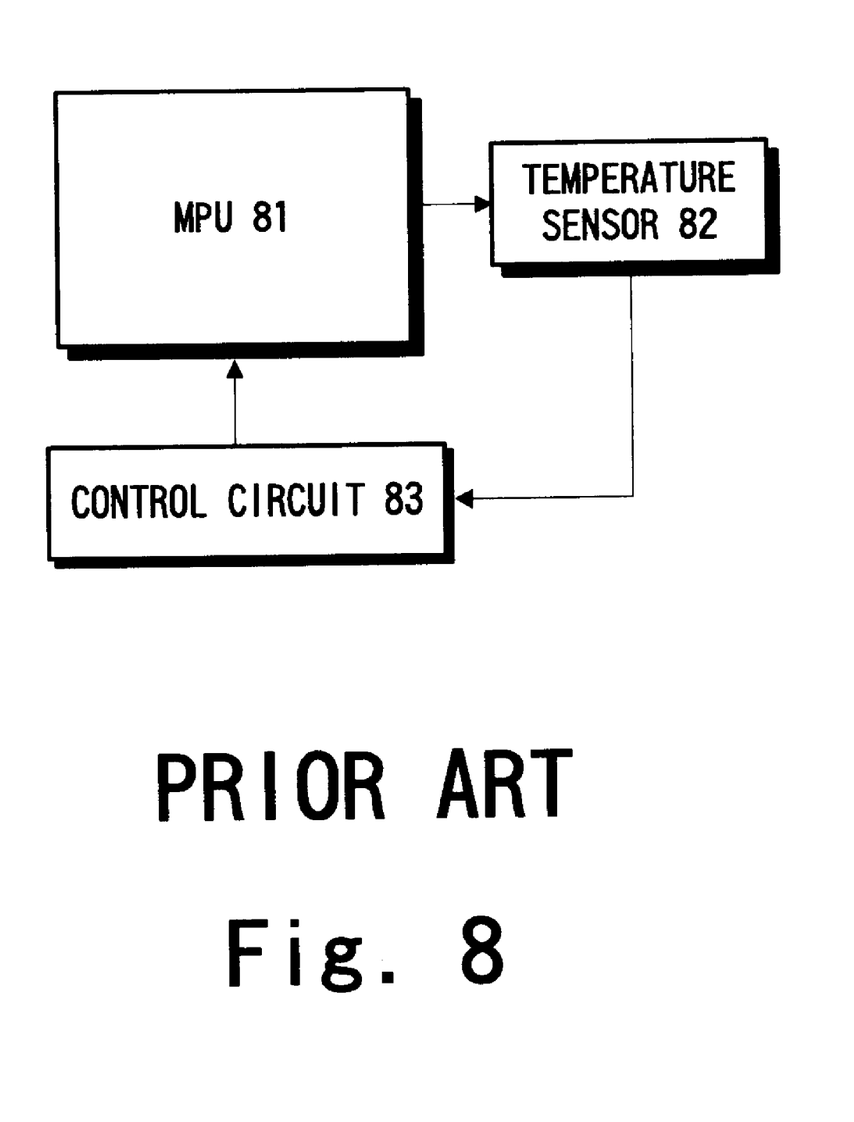
FIG. 8 is a block diagram of a prior art temperature rise suppressing system.

Referring to FIG. 8, a prior art temperature rise suppressing system comprises an MPU 81, which is a typical example of LSI embodying attempts to achieve a higher scale of integration and a higher speed of processing, a temperature sensor 82 for constantly measuring the surface temperature of the MPU 81, and an MPU control circuit 83 for receiving temperature information measured by the temperature sensor 82 and transmitting to the MPU 81 a control signal for controlling the operation of the MPU 81 according to this temperature information. Incidentally, the temperature sensor 82 is provided outside the MPU 81, for instance on the package of the MPU 81.

The control circuit 83 reduces the rate of operation of the MPU 81 per unit time length or suspends the operation of the MPU 81 according to its temperature rise. It also gives an instruction to a clock generator (not shown) to reduce the frequency of a clock to be supplied to the MPU 81.

Such a system can restrain, when the temperature of the MPU 81 has risen, power consumption by the MPU 81, heat generation by the MPU 81 and thereby to control the MPU 81 so that it can normally operate within its normative temperature range.

However, the prior art system of described above cannot utilize the full potential of the MPU 81 because there are differences between variations in delay length actually occurring in the MPU 81 and variations in delay length presumed from temperature changes in the MPU 81 detected by the sensor 82.

These differences invite a drop in the overall processing capacity of the MPU 81 per unit time length even when the stable operation of the MPU 81 is unlikely to be affected.

SUMMARY OF THE INVENTION

An object of the present invention is to provide a semiconductor integrated circuit equipped with an operation control mechanism capable of drawing upon the full capability of the semiconductor integrated circuit all the time.

According to an aspect of the present invention, there is provided a semiconductor integrated circuit which comprises an internal logic circuit, a delay detecting circuit which monitors changes in delay length within the semiconductor integrated circuit, and a central control circuit which controls the quantity of processing per unit time length by the internal logic circuit on the basis of changes in delay length monitored by the delay detecting circuit.

BRIEF DESCRIPTION OF THE DRAWINGS

These and other objects, features, and advantages of the invention will become more apparent from the following detailed description when taken in conjunction with the accompanying drawings, in which.

DESCRIPTION OF THE PREFERRED EMBODIMENTS

Next, the present invention will be described in detail, referring to the drawings.

Figure 1:
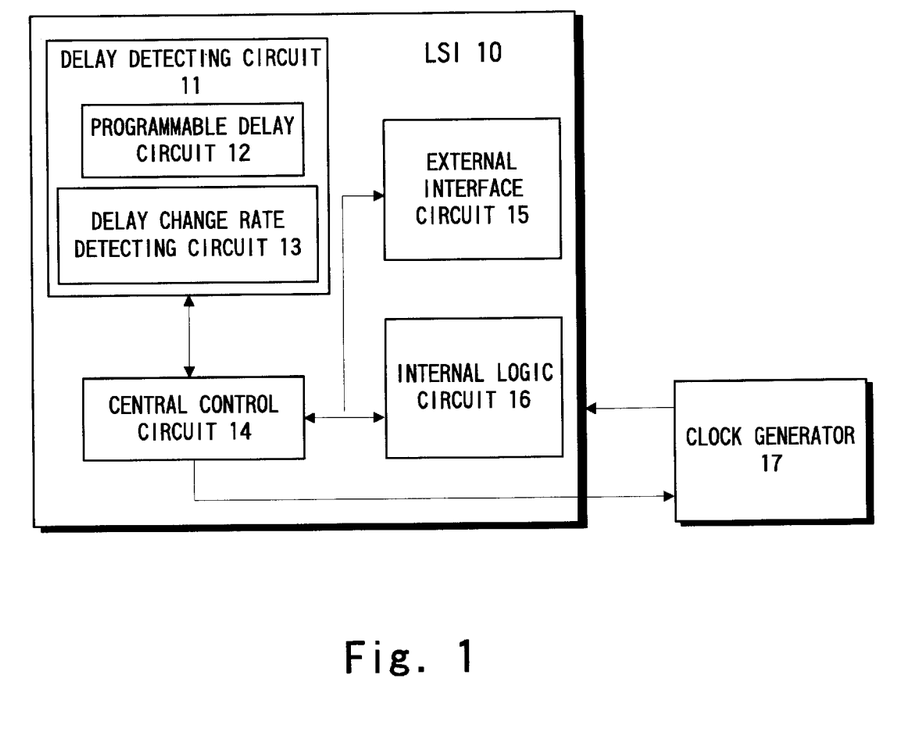
FIG. 1 is a block diagram of an embodiment of the present invention.

Referring to FIG. 1, an embodiment of the present invention comprises an LSI 10 and a clock generator 17. The clock generator 17 may as well be built into the LSI 10.

The LSI 10 comprises a delay detecting circuit 11, a central control circuit 14, an external interface circuit 15, and an internal logic circuit 16.

The delay detecting circuit 11, which is a circuit for detecting any delay generated within the LSI 10 by a temperature rise or the like within the LSI 10, comprises a programmable delay circuit 12, a delay change rate detecting circuit 13, and other circuits (not shown) to be described later.

The programmable delay circuit 12, which can change the delay length in multiple steps, for example, may consist of a plurality of delay circuits generating different delay lengths, for instance. One of this plurality of delay circuits is selectively used in accordance with a delay circuit selection signal transmitted from the central control circuit 14. At the time the LSI 10 starts operation, a prescribed delay circuit within the programmable delay circuit 12 is selected.

The delay change rate detecting circuit 13 is a circuit for detecting any change in the delay length per unit time length of the selected delay circuit.

The central control circuit 14 receives information on the delay length change detected by the delay change rate detecting circuit 13 and, on the basis of this information, selects a delay circuit within the programmable delay circuit 12.

Thus the LSI 10 can constantly monitor changes in delay length occurring within the LSI 10 by detecting delay length changes arising in the built-in programmable delay circuit 12.

Furthermore, according to how the aforementioned delay length varies, the central control circuit 14 instructs the internal logic circuit 16 to put off processing, arbitrates between the internal logic circuit 16 and the external interface circuit 15 to temporarily suspend a clock supplied to the internal logic circuit 16, or instructs the clock generator 17 to reduce the frequency of the clock supplied to the LSI 10.

Figure 2:
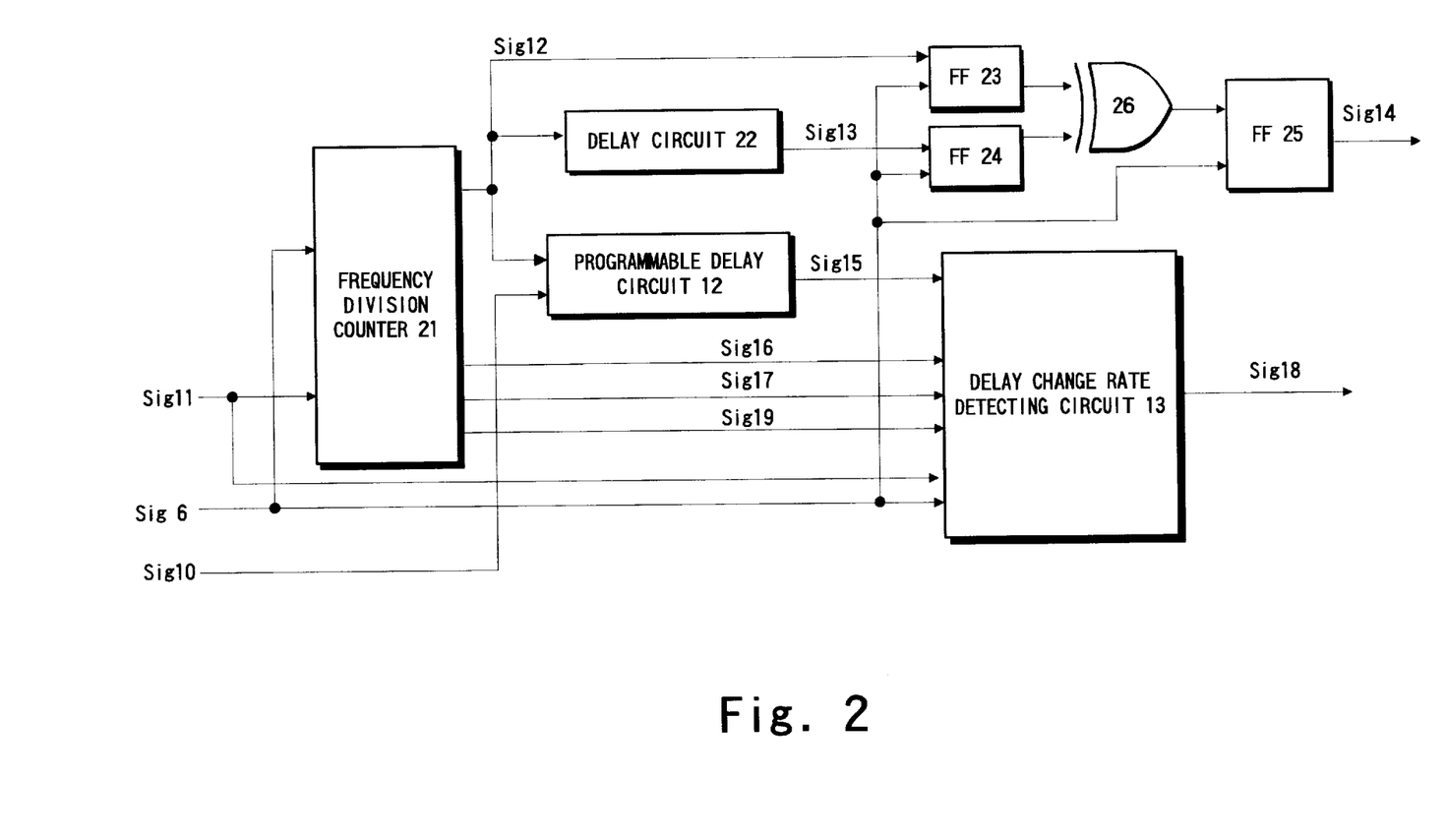
FIG. 2 is a block diagram of a delay detecting circuit 11.

Next, the delay detecting circuit 11 will be described in detail.

Referring to FIG. 2, the delay detecting circuit 11 comprises a frequency division counter 21, a delay circuit 22 having a preset delay length to be discussed later, the programmable delay circuit 12, the delay change rate detecting circuit 13, both aforementioned, flip-flops (FFs) 23 through 25, and an EXCLUSIVE OR circuit 26.

A clock signal (Sig6) supplied from the aforementioned clock generator 17 is supplied to the frequency division counter 21, the delay change rate detecting circuit 13, and the FFs 23 through 25.

The frequency division counter 21 does the period of the clock signal (Sig6) by twice, and supplies these frequency-divided signals (Sig12) to the programmable delay circuit 12, the delay circuit 22, and the FF 23.

The programmable delay circuit 12 receives the delay circuit selection signal (Sig10) from the central control circuit 14, and one delay circuit in the programmable delay circuit 12 is selected according to this delay circuit selection signal (Sig10). Further, the programmable delay circuit 12 causes the entered frequency-divided signal (Sig12) to be delayed by the selected delay circuit in the programmable delay circuit 12, and supplies the delayed signal to the delay change rate detecting circuit 13 (Sig15).

The output signal of the delay circuit 22 (Sig13) is supplied to the FF 24. Thus, the frequency-divided signal (Sig12) is supplied to the FF 24, delayed by the delay circuit 22 it passes.

To the exclusive OR circuit 26 are entered the outputs of the FF 23 and the FF 24, and its output is entered into the FF 25.

It may be pertinent here to give some explanation on the delay length provided by the delay circuit 22.

First, it is supposed that the FFs 23 through 25 are circuits the input data signals entered into each of which fully satisfy the requirements regarding the setup time and hold time with respect to the clock signal (Sig6) entered into each. Thus data are supposed to be given to a prescribed edge of the clock signal (Sig6) earlier than a normatively prescribed timing, and the same data are supposed to be held until later than a normatively prescribed timing.

Therefore, the delay length of the delay circuit 22, where the LSI 10 takes the maximum normative delay length, selects a somewhat greater delay length than the maximum delay length at which the output signal (Sig13) of the delay circuit 22 entered into the FF 24 can satisfy the requirements regarding the setup time and hold time with respect to the clock signal (Sig6).

The reason will be explained below.

Usually, when an LSI is to be designed, it is designed to be operable at the maximum and minimum delay lengths according to the design standard. However, especially in an LSI which is integrated on a particularly large scale and whose internal operating frequency is particularly high, the temperature will rise unless something is done against it, with a possible consequence that the delay arising in the LSI surpasses the maximum delay length according to the design norm.

Therefore, as stated above, an alarm that the delay length is nearing its maximum limit can be detected before it actually reaches the maximum by setting the delay length of the delay circuit 22 slightly above the maximum delay length of the LSI 10 according to the design norm.

In this embodiment, a signal indicating this alarm (Sig14) is supplied to the central control circuit 14. Thus, if the value of this output is "0 (low)" (hereinafter merely refers to as "0"), it means that the LSI 10 can normally operate within its design limit. Otherwise, when the value of this output is "1 (high)" (hereinafter merely refers to as "1"), it means that there is the risk that the LSI 10 may become unable to operate normally within its design limit, Next will be described how the delay change rate detecting circuit 13 functions.

Figure 3:
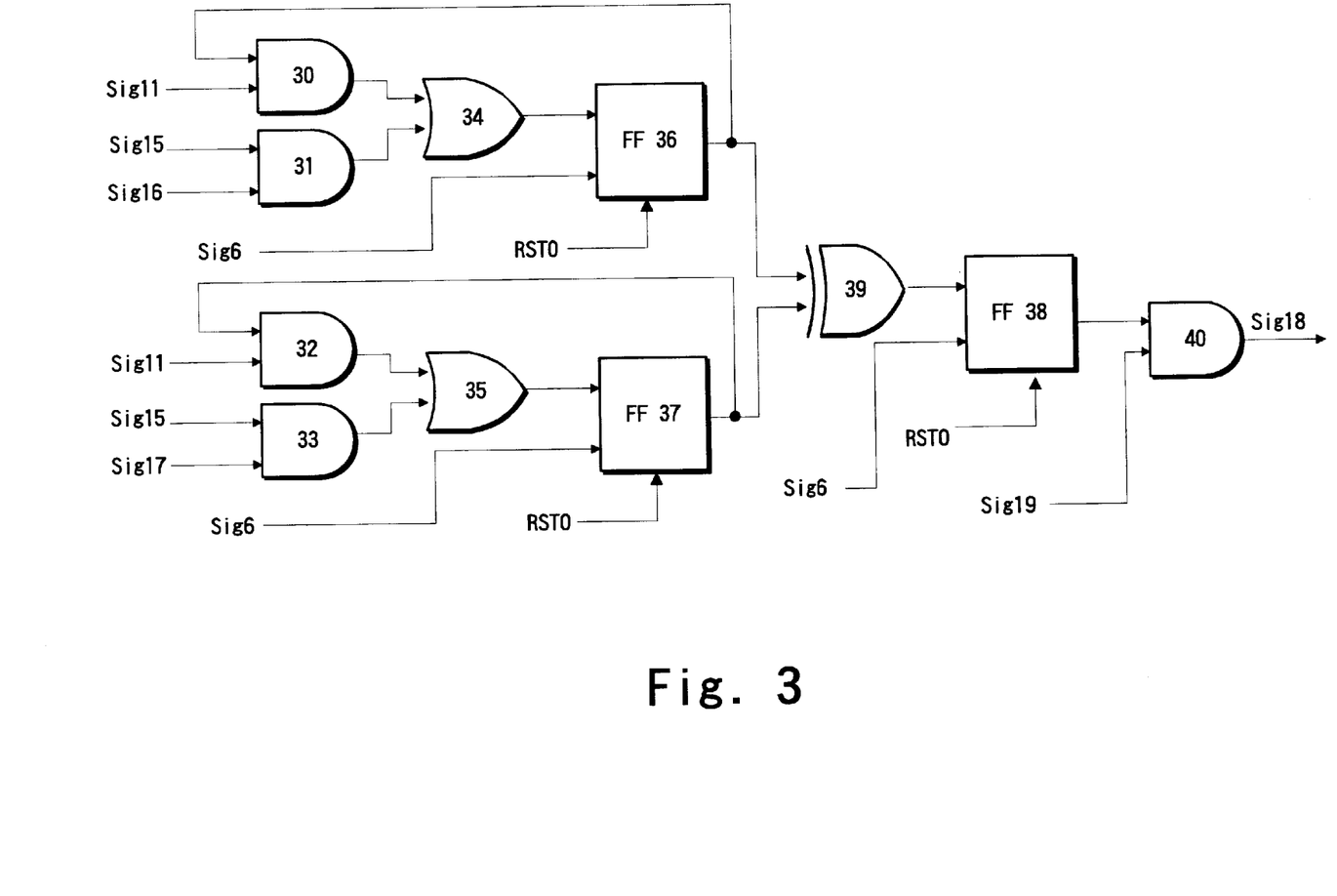
FIG. 3 is a block diagram of a delay change rate detecting circuit 13.

Referring to FIG. 3, the delay change rate detecting circuit 13 includes AND circuits 30 through 33, OR circuits 34 and 35, FFs 36 through 38, an EXCLUSIVE OR circuit 39, and an AND circuit 40.

An output signal of FF36 and a start-clear signal (Sig11), which indicates the start and end of delay length detection and is supplied from the central control circuit 14, are supplied to the AND circuit 30. An output signal (Sig15) of the programmable delay circuit 12 and a signal (Sig16), which is supplied from the counter 21, are supplied to the AND circuit 31. The signal (Sig16) is controlled by the central control circuit 14 as it mentions later. Both of output signals of the AND circuits 30 and 31 are supplied to the OR circuits 34. An output signal of the OR circuits 34 is supplied to the FF 36.

An output signal of FF37 and the start-clear signal (Sig11), which is supplied from the central control circuit 14, are supplied to the AND circuit 32. The output signal (Sig15) of the programmable delay circuit 12 and a signal (Sig17) supplied from the counter 21, are supplied to the AND circuit 33. The signal (Sig17), which is controlled by the central control circuit 14 as it mentions later. Both of output signals of the AND circuits 32 and 33 are supplied to the OR circuits 35. An output signal of the OR circuits 35 is supplied to the FF 37.

Both of output signals of the FFs 36 and 37 are supplied to the EXCLUSIVE OR circuit 39. An output signal of the EXCLUSIVE OR circuit 39 is supplied to the FF 38. The output signal of the FF 38 and a signal described later (Sig19) are supplied to the AND circuit 40. The clock signal (Sig6) is supplied to the FFs 36 through 38.

When a power is supplied to the LSI 10, the central control circuit 14 initializes the delay detecting circuit, i.e. initializes the internal FFs.

Figure 4:
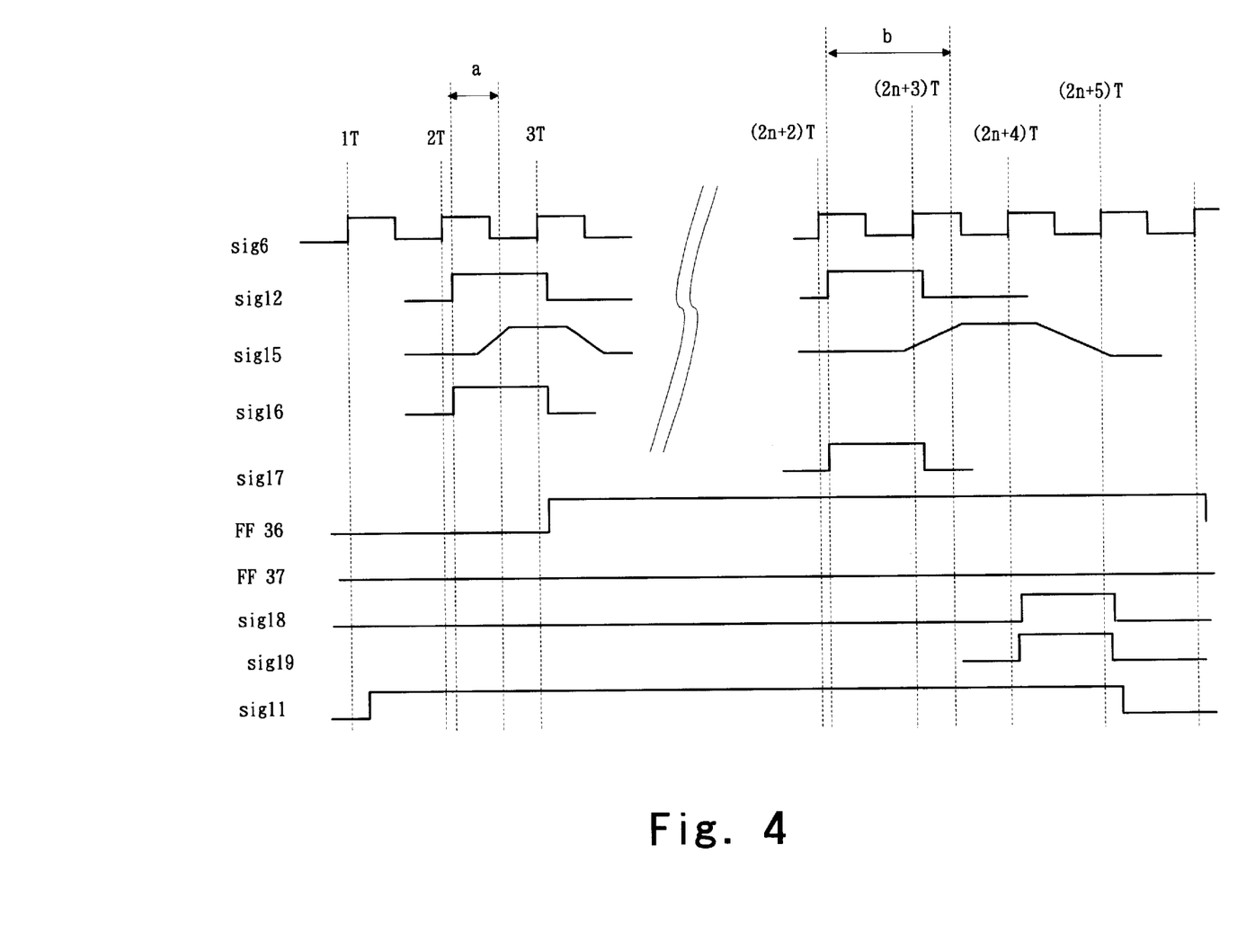
FIG. 4 is a timing chart of the delay change rate detecting circuit 13.

FIG. 4 is a timing chart of a delay change rate detecting circuit 13 when an increase in delay length has been detected with 2nT being used as the unit time length. In FIG. 4, delay is emphasized.

Referring to FIG. 4, now, one period of the clock signal supplied from the clock generator 17 is supposed to be "T", with 1T, 2T ... 2nT, (2n+2)T denoting points of time.

After one delay circuit in the programmable delay circuit 12 has been selected according to a delay circuit selection signal (Sig10) from the central control circuit 14, a start-clear signal (Sig11) is entered into the delay change rate detecting circuit 13 from the central control circuit 14.

Now, it is supposed that the start clear signal (Sig11) is asserted to "1" indicating the start of delay length detection at a point of time 1T. Then, "1" is asserted to the AND circuit 31 from the counter 21 for a period of 1T from the point of time 2T. This signal is controlled by the circuit 14, and shown with Sig16 in FIG. 3 and 4.

The FF 36 holds value of the output signal (Sig15) of the programmable delay circuit 12 at time 3T ("1") until the value of the start clear signal (Sig11) turns to "0".

After that, "1" is asserted to the AND circuit 33 from the counter 21 at (2n+2)T (n is a natural number), a point of time 2nT later, for a period of 1T. This signal is controlled by the circuit 14, and shown with Sig17 in FIG. 3 and 4.

The FF 37 holds value of the output signal (Sig15) of the programmable delay circuit 12 at time (2n+3)T ("0") until the value of the start clear signal (Sig11) turns to "0".

Then, the EXCLUSIVE OR circuit 39 compares the values of the FF 36 and the FF 37 at time (2n+4)T. The signal (Sig19) supplied from counter 21 and controlled by the circuit 14 indicates a comparative timing.

If these values are found identical, i.e. if no increase in delay length is detected, the value of a output signal (Sig18) of the AND circuit 40 will be "0". If these values are not found identical, i.e. if an increase in delay length is detected, the value of a output signal (Sig18) of the AND circuit 40 will be "1".

Both period "a" and "b" shown in FIG. 4 indicate the increased delay length of the output signal (Sig15) of the programmable delay circuit 12.

If the value of the delay length "a" here is sufficiently shorter than the period T, the setup time and the hold time of the output signal (Sig15) relative to the clock signal (Sig6) will be adequate at the point of time 3T. Accordingly, if this output signal (Sig15) is sampled with the clock signal (Sig6), a similar value ("1") to the result ("1") of the sampling with the frequency-divided signal (Sig12) will be sampled. In this way, the value of the FF36 at the point of time 3T will prove to be "1".

When the value of "b" is 2T>b>T>a, the value resulting from the sampling of the output signal (Sig15) with the clock signal (Sig6) at the point of time (2n+3)T becomes "0". Therefore, the value of the FF 37 at the point of time (2n+3)T will be "0", different from "1", the result of sampling of the frequency-divided signal (Sig12) with the clock signal (Sig6).

Thus, if the values of the FF 36 and 37 compared at the point of time (2n+4) are found different from each other, the value of the signal (Sig18) will be "1", and the delay change rate detecting circuit 13 detects an increase in the delay length of the output signal (Sig15) of the programmable delay circuit 12 in the lapse of a time length 2nT. The central control circuit 14 receive the result of this detection.

Next, the processing by the central control circuit 14 will be described below.

The central control circuit 14, on the basis of the increase in delay length detected by the delay detecting circuit 11, keeps the internal temperature of the LSI 10 constant by performing control to reduce the load of processing by the LSI 10 per unit time length, and thereby averages the processing capacity of the LSI 10 to accomplish control to keep the capacity at a high average level.

Specifically, there are the following methods to reduce the processing load in the LSI 10 per unit time length.

A first method is to have the internal logic circuit 16 put off processing and wait (hereinafter refers to as WAIT); a second method, to temporarily suspend the supply of the clock signal to the internal logic circuit 16; and a third method, to reduce the frequency of the clock signal supplied to the LSI 10.

Figure 5:
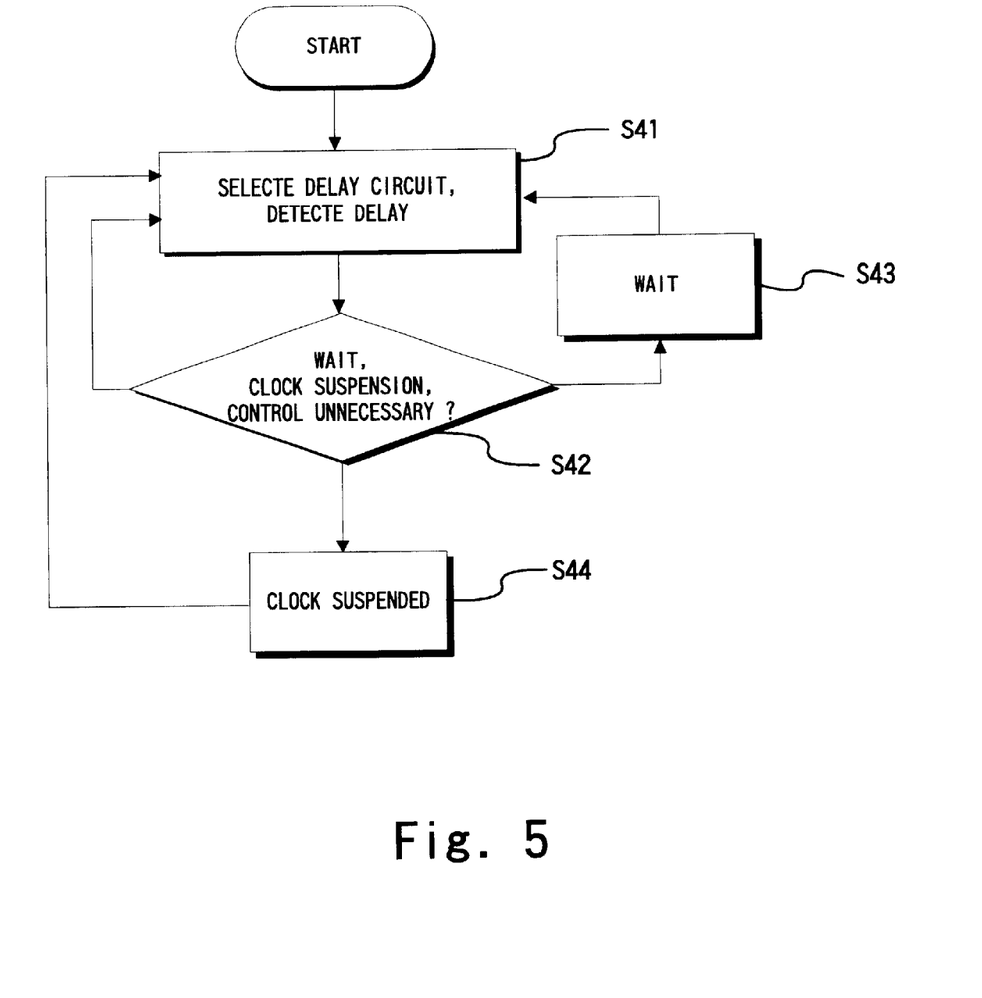
FIG. 5 is a flow chart for describing the control by a central control circuit 14.

FIG. 5 is a flow chart for describing how the central control circuit 14 performs control when the first and second methods out of these three are used.

Referring to FIG. 5, at the time the LSI 10 starts its operation, the central control circuit 14 selects the prescribed delay circuit in the programmable delay circuit 12 and obtains the result of detection by the delay change rate detecting circuit 13 of any change in delay length of the output signal (Sig15) of the programmable delay circuit 12 (step S41)

Next, on the basis of this result of detection, the central control circuit 14 determines whether it has to request the internal logic circuit 16 for additional WAIT or to temporarily suspend the supply of the clock signal from the internal logic circuit 16, or neither of such control steps is required (step S42).

It has to be noted that, for control immediately after the LSI 10 has started to operate, neither the addition of WAIT nor the temporarily suspension of the clock signal is determined to be necessary, and a return to step S41 will take place, unless the operating environment of the LSI 10 is abnormal, for instance, any individual device is faulty or actuation is to be done at high temperature under low voltage.

In the second or any subsequent round of processing of step S41, the central control circuit 14 transmits a delay selection signal (Sig10) to the programmable delay circuit 12, and selects one of delay circuit in the programmable delay circuit 12, on the basis of the result of the detection (step S41).

In addition, the delay circuit that is selected when no increase in delay length has been detected is a delay circuit whose delay length is greater than that of the present delay circuit. This manner of selection allows even an infinitesimal change in delay length to be detected all the time.

Then, on the basis of the result of the detection of any increase in delay length by the delay change rate detecting circuit 13 over the delay length of the selected delay circuit out of the programmable delay circuit 12 and data on delay length changes continuously detected since the start of operation of the LSI 10, the central control circuit 14, as described above, judges whether it has to request the internal logic circuit 16 for additional WAIT or to temporarily suspend the supply of the clock signal from the internal logic circuit 16, or neither of such control steps is required (step S42).

First will be described a case in which, as a result of determination at step S42, the central control circuit 14 finds it unnecessary to request the internal logic circuit 16 for additional WAIT or to temporarily suspend the supply of the clock signal.

In this case, if the delay length tends to decrease, the central control circuit 14 returns to the control at step S41.

Next, the operation when, as a result of judgment at step S42, the central control circuit 14 finds it necessary either to request the internal logic circuit 16 for additional WAIT or to temporarily suspend the supply of the clock signal, will be described.

In this case, the central control circuit 14 requests the internal logic circuit 16 for additional WAIT (step S43) Then, after the central control circuit 14 requests the internal logic circuit 16 for additional WAIT at step 43, the central control circuit 14 returns to the control at step S41.

Here the condition under which the central control circuit 14 judges that it has to request the internal logic circuit 16 for additional WAIT may be preset in the central control circuit 14 in terms of a delay length increase rate according to the scale of integration and the operating frequency of the LSI 10. This condition may as well be programmably selected by the user of the LSI 10 according to the environment in which the LSI 10 is to be used.

Next, the operation when, as a result of judgment at step S42, the central control circuit 14 finds that control by additional WAIT is insufficient but temporary suspension of clock signal supply to the internal logic circuit 16 is also necessary, will be described.

The condition here under which the central control circuit 14 judges that temporary suspension of clock signal supply to the internal logic circuit 16 is necessary is as follows, for instance.

First is a case in which the central control circuit 14 has detected that the value of the aforementioned the signal (Sig14) has become "1", i.e. the delay length of an internal circuit of the LSI 10 is nearing its upper limit of the designed range in which the LSI 10 can stably operate.

Second is a case in which the central control circuit 14 has judged, on the basis of data on delay length changes detected by the delay change rate detecting circuit 13, that the delay length increase within the LSI 10 will continue.

The central control circuit 14, when it is to temporarily suspend clock signal supply to the internal logic circuit 16, executes arbitration for the external interface circuit 15 to make possible temporary suspension of clock signal supply to the internal logic circuit 16 and, after that, temporarily suspends clock signal supply to the internal logic circuit 16 (step S44).

Then the central control circuit 14 returns to the control at step S41, checks the delay length again, and moves ahead to the control at step S42. Thus it continuously judges whether temporary suspension of clock signal supply to the internal logic circuit 16 is necessary, or it is sufficient to request the internal logic circuit 16 for WAIT, or that neither is necessary.

The temporary suspension of clock signal supply to the internal logic circuit 16 will be continued if, as a result of delay length examination at step S41 after the suspension of clock signal supply to the internal logic circuit 16 (step S44), the upper limit of the normative stable operation range of the LSI 10 is being approached or has been surpassed, until the delay length decreases to the stable operation range of the LSI 10.

During this while, the temporary suspension of clock signal supply to the internal logic circuit 16 and its release may be alternated at predetermined intervals.

As stated above, whereas the central control circuit 14 requests the internal logic circuit 16 for WAIT or temporarily suspends clock signal supply to the internal logic circuit 16 by detecting any change in delay length within the LSI 10, it may as well reduce the frequency of the clock signal instead of temporarily suspending clock signal supply.

Next will be described a case in which the LSI has a plurality of internal logic circuits with reference to FIGS. 6 and 7.

Where the LSI has a plurality of internal logic circuits, the internal logic circuits can also be controlled by detecting changes in delay length within the LSI 10 using the above-described delay detecting circuit 11.

Figure 6:
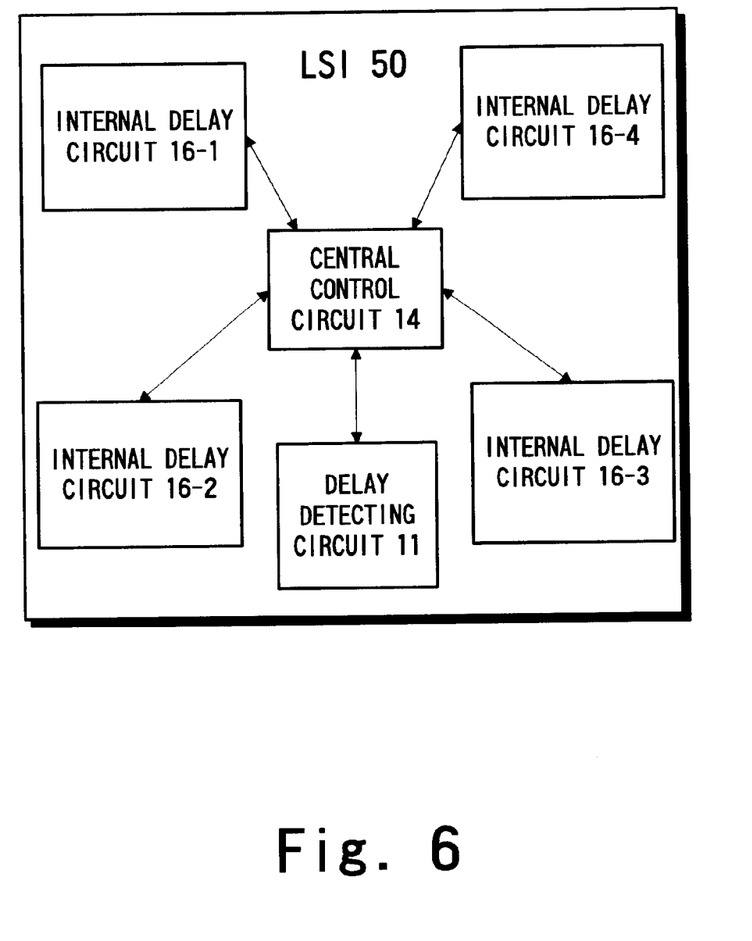
FIG. 6 is a block diagram illustrating an LSI 50 comprising a plurality of internal logic circuits and a delay detecting circuit 11.

FIG. 6 is a block diagram illustrating an LSI 50 comprising a plurality of internal logic circuits 16-1 through 16-4 and a delay detecting circuit 11.

Here the plurality of internal logic circuits 16-1 through 16-4 derive from a macro-division of the internal logic circuit 16, described with reference to FIG. 1, according to the function.

In the LSI 50, the central control circuit 14 can, on the basis of the result of delay detection by the delay detecting circuit 11, control clock signals supplied to the internal logic circuits 16-1 through 16-4 in the same way as in the LSI 10 described with reference to FIG. 1.

However, as the LSI 50 is incapable of delay length detection in each of the internal logic circuits 16-1 through 16-4, the central control circuit 14 will request all the internal logic circuits for WAIT or temporarily suspend clock signal supply to all of them if the delay detecting circuit 11 detects any increase in delay length, and thereby deteriorate processing by normally operable internal logic circuits. In other words, the central control circuit 14 would perform more control than the minimum required.

Figure 7:
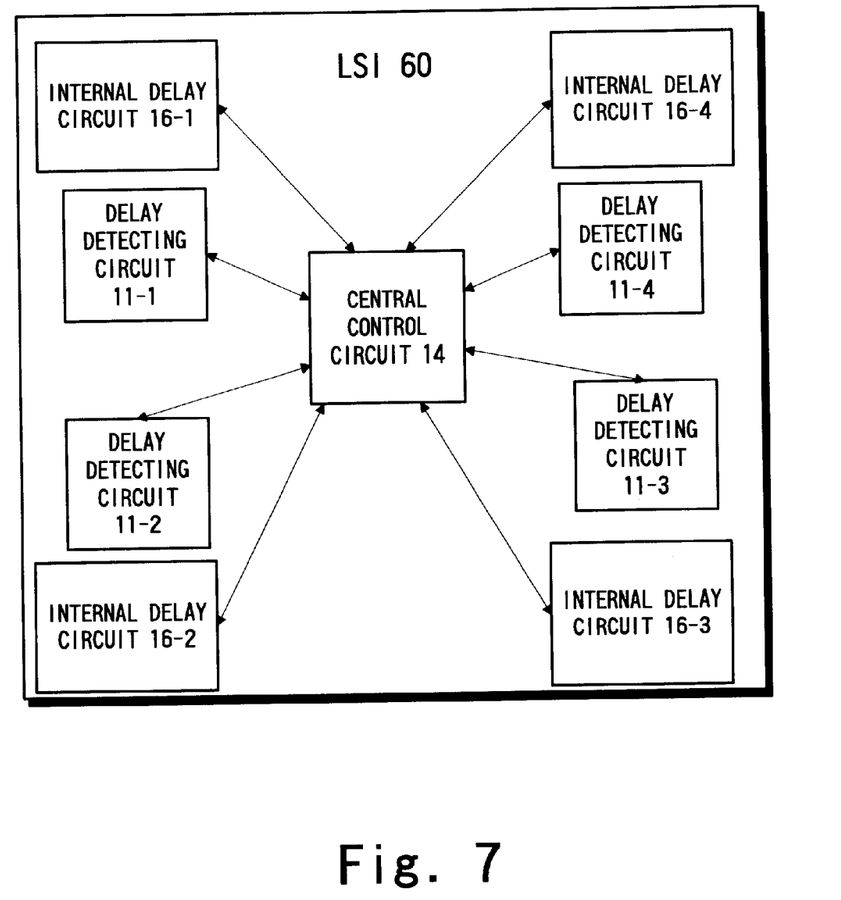
FIG. 7 is a block diagram illustrating an LSI 60 provided with a delay detecting circuit for each of the plurality of internal logic circuits.

Then, this problem can be solved by providing a delay detecting circuit for each internal logic circuit as shown in FIG. 7.

Referring to FIG. 7, the LSI 60 comprises a central control circuit 14, internal logic circuits 16-1 through 16-4, and delay detecting circuits 11-1 through 11-4 each of which is laid out in the vicinity of one or another of the internal logic circuits.

The central control circuit 14 can perform optimal control over each of the internal logic circuits 16-1 through 16-4 according to data on delay length changes detected by the delay detecting circuits 11-1 through 11-4.

For instance, if the quantity of processing per unit time length by the internal logic circuit 16-4 is far greater than those by the internal logic circuits 16-1 through 16-3, the central control circuit 14 can perceive this far greater quantity according to the result of delay length detection by the delay detecting circuit 11-4 laid out in the vicinity of the internal logic circuit 16-4, and the central control circuit 14 controls clock signal supply to the internal logic circuit 16-4 by requesting only the internal logic circuit 16-4 for WAIT lock signal. Thus, it can reduce the quantity of processing per unit time length by the internal logic circuit 16-4 alone.

The performance of such control by the central control circuit 14 enables the internal logic circuits 16-1 through 16-3 to carry out usual operation, i.e. optimal operation without restriction, in the above-described case. Thus, as the control performed by the central control circuit 14 is the minimum required control, the LSI 60 as a whole can perform functions free from inefficiency. Moreover, by reducing the quantity of processing per unit length by the internal logic circuit 16-4, heat generating from the internal logic circuit 16-4 and other circuits around it can be prevented from propagating to the internal logic circuits 16-1 through 16-3.

As hitherto described, according to the present invention, a delay detecting circuit or circuits provided within an LSI can constantly monitor any change in delay length per unit time length within the LSI, and control can be effected over the internal logic circuit to reduce the processing load per unit time length within the LSI 10 according to the detected delay length or delay length increase rate, resulting in the advantage that the processing capacity of the LSI can be efficiently utilized all the time.

Moreover, according to the invention, where the LSI has internal logic circuits which can be treated as a plurality of blocks, each internal logic circuit can be optimally controlled by providing a delay detecting circuit in the vicinity of each internal logic circuit (block) and causing it to detect any change in delay length, enabling the LSI to operate even more efficiently.

What is claimed is:

1. A semiconductor integrated circuit comprising:

an internal logic circuit;

a delay detecting circuit which detects changes in delay length of an internal signal within said semiconductor integrated circuit by comparing values of said internal signal at different times; and a central control circuit which controls the quantity of processing per unit time length by said internal logic circuit on the basis of said changes in delay length, wherein said delay detecting circuit comprises a delay change rate detecting circuit which transmits a comparative result to said central control circuit, and wherein said delay change rate detecting circuit comprises:

a first element which holds a first value in response to said internal signal at a first timing;

a second element which holds a second value in response to said internal signal at a second timing; and a third element which generates said comparative result by comparing said first value and said second value.

2. The semiconductor integrated circuit as claimed in claim 1, wherein said changes in said delay length comprise increases in said delay length.

3. A semiconductor integrated circuit comprising:

an internal logic circuit;

a delay detecting circuit which detects changes in delay length of an internal signal within said semiconductor integrated circuit; and a central control circuit which controls the quantity of processing per unit time length by said internal logic circuit on the basis of changes in delay length monitored by said delay detecting circuit, wherein said delay detecting circuit comprises a delay change rate detecting circuit which transmits a comparative result comparing a value of said internal signal of said semiconductor integrated circuit at first time and a value of the signal at second time after predetermined time elapse from the first time, to said central control circuit, wherein said comparative result indicates whether or not an increase in delay occurred to said internal signal, and wherein said delay change rate detecting circuit comprises:

a first element which holds a first value in response to said internal signal at a first timing;

a second element which holds a second value in response to said internal signal at a second timing; and a third element which generates said comparative result by comparing said first value and said second value.

4. The semiconductor integrated circuit as claimed in claim 1, wherein said delay detecting circuit further comprises a programmable delay circuit which can change delay length arising in said programmable delay circuit in accordance with a direction of said central control circuit, and wherein said internal signal comprises an output signal of said programmable delay circuit.

5. The semiconductor integrated circuit as claimed in claim 4, wherein said central control circuit, when said comparative result indicates no increase in delay occurred to said output signal of said programmable delay circuit, makes delay length arising in said programmable delay circuit greater than a present delay length.

6. A semiconductor integrated circuit comprising:

plurality of internal logic circuits;

plurality of delay detecting circuits, each of which is laid out in the vicinity of one or another of the internal logic circuits, and monitors changes in delay length of an internal signal within said semiconductor integrated circuit; and a central control circuit which controls the quantity of processing per unit time length by said internal logic circuits on the basis of changes in delay length monitored by said delay detecting circuits, wherein each delay detecting circuit comprises a delay change rate detecting circuit which transmits a comparative result to said central control circuit, and wherein said delay change rate detecting circuit comprises:

a first element which holds a first value in response to said internal signal at a first timing;

a second element which holds a second value in response to said internal signal at a second timing; and a third element which generates said comparative result by comparing said first value and said second value.

7. The semiconductor integrated circuit as claimed in claim 4, wherein said programmable delay circuit comprises a plurality of delay circuits generating different delay lengths, and wherein said central control circuit transmits a delay circuit selection signal to said delay detecting circuit for selecting one of said plurality of delay circuits.

8. The semiconductor integrated circuit as claimed in claim 7, wherein said central control circuit selects one of said plurality of delay circuits based on said comparative result.

9. A semiconductor integrated circuit comprising:

an internal logic circuit;

a delay detecting circuit which detects changes in delay length of an internal signal within said semiconductor integrated circuit by comparing values of said internal signal at different times; and a central control circuit which controls the quantity of processing per unit time length by said internal logic circuit on the basis of said changes in delay length, wherein said central control circuit controls a quantity of processing by instructing said internal logic circuit to put off processing.

10. A semiconductor integrated circuit comprising:

an internal logic circuit;

a delay detecting circuit which detects changes in delay length of an internal signal within said semiconductor integrated circuit by comparing values of said internal signal at different times; and a central control circuit which controls the quantity of processing per unit time length by said internal logic circuit on the basis of said changes in delay length, wherein said central control circuit controls a quantity of processing by temporarily suspending a supply of a clock signal to said internal logic circuit.

11. A semiconductor integrated circuit comprising:

an internal logic circuit;

a delay detecting circuit which detects changes in delay length of an internal signal within said semiconductor integrated circuit by comparing values of said internal signal at different times; and a central control circuit which controls the quantity of processing per unit time length by said internal logic circuit on the basis of said changes in delay length, wherein said central control circuit controls a quantity of processing by reducing a frequency of a clock signal to said internal logic circuit.

12. The semiconductor integrated circuit as claimed in claim 1, wherein said delay detecting circuit transmits an alarm signal to said central control circuit to indicate that a delay length is nearing a maximum limit.

* * * * *